April 21, 1931. R. D. CHEESMAN 1,802,196
PROCESS OF MAKING PORTLAND CEMENT
Filed Aug. 22, 1928
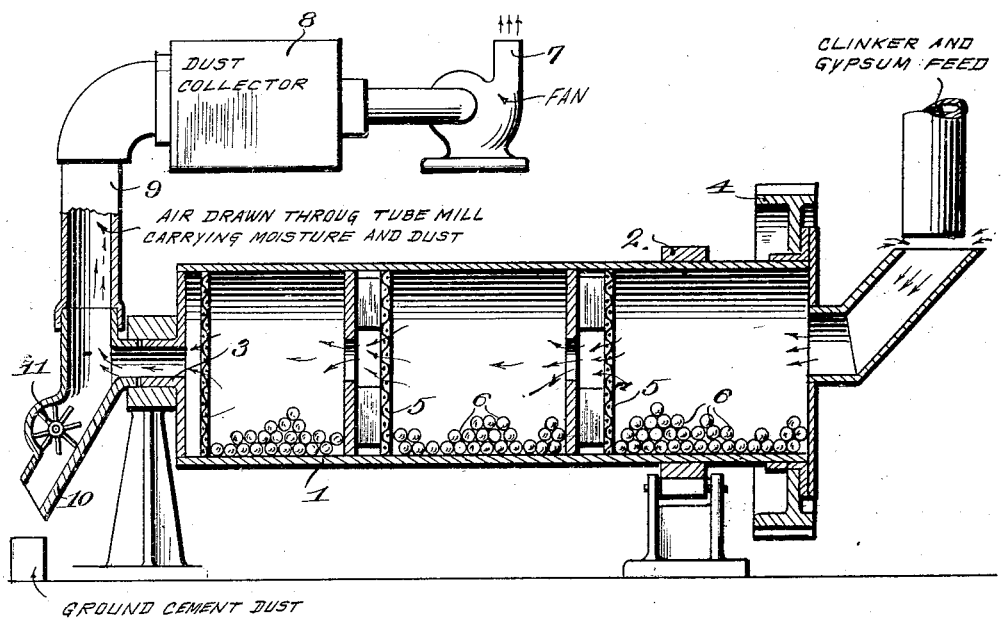

Patented Apr. 21, 1931

1,802,196

UNITED STATES PATENT OFFICE

RICHARD D. CHEESMAN, OF RALEIGH, NORTH CAROLINA

PROCESS OF MAKING PORTLAND CEMENT

Application filed August 22, 1928. Serial No. 301,411.

My invention relates to a process of making Portland cement, and it consists in the steps hereinafter set forth and claimed.

An object of my invention is to provide a process by means of which a superior grade of Portland cement may be made which cement is capable of forming concrete of greater strength than the ordinary grade of cement.

A further object is to provide a process which is applicable to various forms of grinding mills in ordinary use without the necessity of changing the structure of such mills materially.

A further object is to provide a process of making cement which can be carried out without material increase in cost over the ordinary process.

Other objects and advantages will appear in the new and novel features of the invention to be particularly pointed out in the appended claims.

My invention is illustrated in the accompanying drawing which is a section through a tube mill of the type which may be used successfully in this process.

Portland cement is made by heating to incipient fusion or vitrification an intimate mixture of an argillaceous substance such as clay or shale, and a calcareous substance such as limestone or marl, in which mixture the percentage of silica, alumina and iron oxide bears to the percentage of lime the ratio approximately 1:2 which vitrified product does not slake with water but upon grinding forms an energetic hydraulic cement.

If Portland cement clinker is ground after being cooled without the addition of any foreign substance, the resultant cement shows a flash or quick set. The usual practice is to add approximately 3% of gypsum which acts as a retarder. The early strength qualities of Portland cement are directly proportioned to the amount of what is known as flour in the cement. The amount of flour in the cement depends on the extent of pulverizing or grinding.

Considerable frictional heat is generated in the course of grinding. This is particularly noticeable in a closed grinding unit such as a tube-mill. The temperature of the cement will increase as much as 300 degrees F. This causes the added gypsum to lose varying amounts of its water of crystallization.

As this vapor saturates the air in the grinding units beyond the dew-point, it condenses on the suspended particles of pulverized clinker reacting with same and causing this reacted cement to lose its ultimate hydraulic properties. The potential strength of cement ground under these conditions is as low as 75% of that of the original clinker.

This saturated moisture condition also by reacting with the suspended cement particles causes a coating or deposit of cementitious material to form on the grinding media thereby reducing the efficiency of the same.

The present invention involves the ventilating of the grinding units whereby fresh air will be introduced so as to reduce the moisture condition below dew-point. In carrying out my invention I may make use of a tube mill like that shown in the drawing. This consists of a cylinder 1 which is revolved on trunnions 2 and 3 by means of a drive wheel 4. The cylinder is provided with partitions 5 and with the usual grinding balls 6.

In order to cause a stream of air to pass through the tube mill I provide a suction fan 7 which is connected to a dust collector 8, the latter being connected by a pipe 9 with the hollow trunnion 3. At 10 I have shown a discharge chute having a rotary member 11.

The material is fed into the tube in the ordinary way and during the grinding process heat is developed which, as stated, drives off from the gypsum water of crystallization. The air which passes through the tube collects this moisture and removes it and the cement flour passes through the outlet 10 and past the rotating element 11 which, it will be observed, permits the discharge of the cement material in the direction shown by the arrow, but which acts as a valve to prevent air from being drawn in through the end of the discharge pipe 10.

I am aware that it is not new to pass air through a tube mill but so far as I am aware no one has yet gotten rid of the moisture liberated from a retarder through the heat of the grinding operation. As stated above, this moisture tends to react with the suspended particles so as to cause them to lose their hydraulic properties. By getting rid of the moisture the original potential strength of the cement is preserved. Since the air is drawn in through the opposite end of the cylinder from the discharge pipe end and passes entirely through the cylinder any moisture liberated in any portion of the cylinder is taken up by the air and removed.

I claim:

1. The herein described process of producing Portland cement which consists in grinding Portland cement clinkers together with gypsum containing water of crystallization and removing the moisture liberated by the heat of the grinding operation.

2. The herein described process of producing Portland cement which consists in grinding Portland cement clinkers together with gypsum containing water of crystallization and removing the moisture liberated by the heat of the grinding operation continuously during the grinding step.

3. The herein described process of producing Portland cement which consists in grinding Portland cement clinkers together with gypsum containing water of crystallization and in passing a current of air through the grinding mechanism while the latter is in operation, thereby removing moisture liberated by the heat of the grinding step.

4. The herein described process of producing Portland cement which consists in grinding cement making material including gypsum having moisture therein capable of being eliminated by the heat of the grinding step and in removing the moisture thus liberated by a current of air.

RICHARD D. CHEESMAN.